(No Model.)

10 Sheets—Sheet 1.

J. B. G. A. CANET.
BREECH LOADING ORDNANCE.

No. 474,289. Patented May 3, 1892.

(No Model.) 10 Sheets—Sheet 2.

J. B. G. A. CANET.
BREECH LOADING ORDNANCE.

No. 474,289. Patented May 3, 1892.

Witnesses:
J. A. Rutherford
Geo. W. Rea

Inventor:
Jean B. G. A. Canet,
By James L. Norris.
Attorney (No Model.)  10 Sheets—Sheet 3.
J. B. G. A. CANET.
BREECH LOADING ORDNANCE.

No. 474,289. Patented May 3, 1892.

(No Model.) 10 Sheets—Sheet 4.
J. B. G. A. CANET.
BREECH LOADING ORDNANCE.

No. 474,289. Patented May 3, 1892.

(No Model.) 10 Sheets—Sheet 5.

J. B. G. A. CANET.
BREECH LOADING ORDNANCE.

No. 474,289. Patented May 3, 1892.

(No Model.) 10 Sheets—Sheet 8.
J. B. G. A. CANET.
BREECH LOADING ORDNANCE.
No. 474,289. Patented May 3, 1892.

Witnesses:
J. A. Rutherford.
Geo. W. Rea.

Inventor:
Jean B. G. A. Canet
By James L. Norris
Attorney (No Model.)    J. B. G. A. CANET.    10 Sheets—Sheet 9.
BREECH LOADING ORDNANCE.

No. 474,289.    Patented May 3, 1892.

(No Model.) 10 Sheets—Sheet 10.
J. B. G. A. CANET.
BREECH LOADING ORDNANCE.
No. 474,289. Patented May 3, 1892.
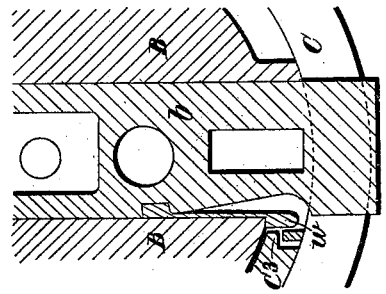
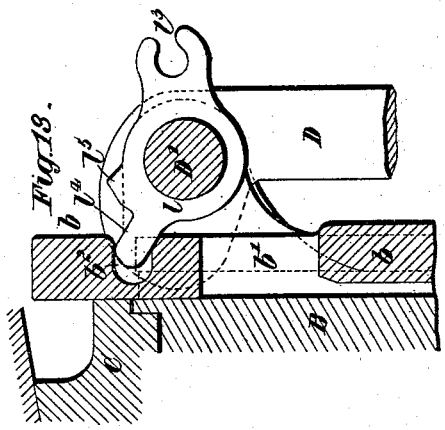
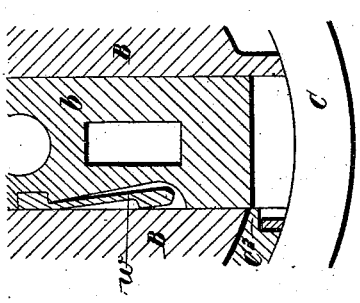
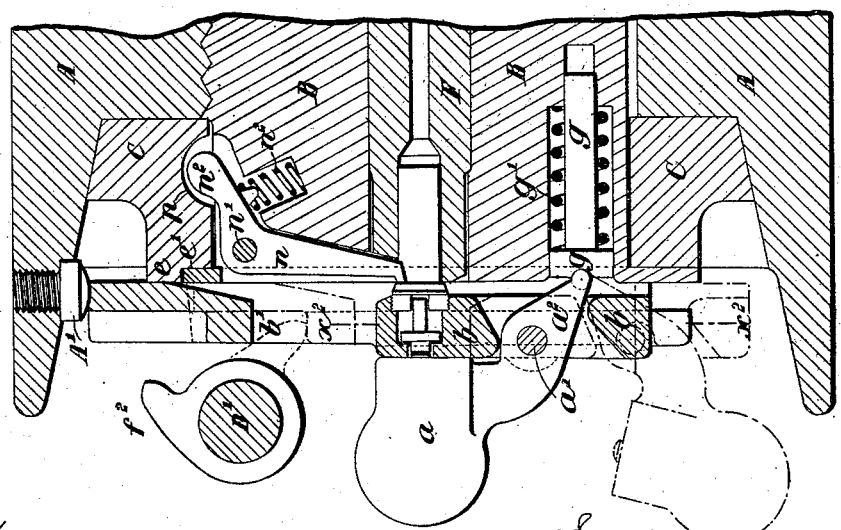

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF OPENSHAW, ENGLAND.

BREECH-LOADING ORDNANCE.

SPECIFICATION forming part of Letters Patent No. 474,289, dated May 3, 1892.

Application filed April 17, 1889. Serial No. 307,567. (No model.) Patented in France April 21, 1886, No. 173,544.

*To all whom it may concern:*

Be it known that I, JEAN BAPTISTE GUSTAVE ADOLPHE CANET, engineer, a citizen of the Republic of France, and a resident of Paris, France, have invented new and useful Improvements in Breech-Loading Ordnance, (for which I have obtained a patent in France, No. 173,544, dated April 21, 1886, and certificate of addition dated October 22, 1886,) of which the following is a specification, reference being had to the accompanying drawings.

My invention relates to breech-loading ordnance of the kind or class wherein a breech-screw or breech-plug having interrupted screw-threads is employed for closing the breech.

My said invention comprises the combination, with the breech-screw and a plastic obturator, of a head which is movable upon a rod or stem fixed in the breech-screw for the purpose of compressing the said obturator. It also comprises the combination, with the parts above mentioned, of a metal cup or washer, which is placed between the breech-screw and the plastic obturator.

My said invention, moreover, comprises various improvements in the breech mechanism.

Figure 1:
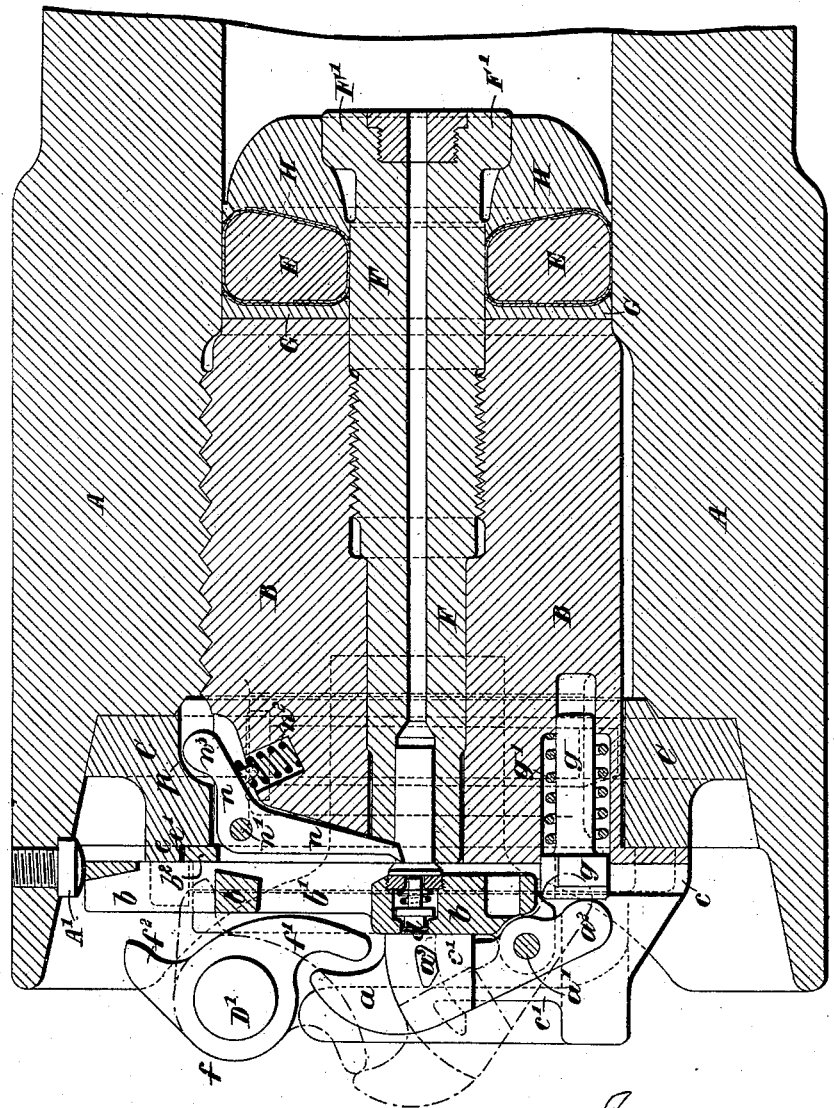
Figure 2:
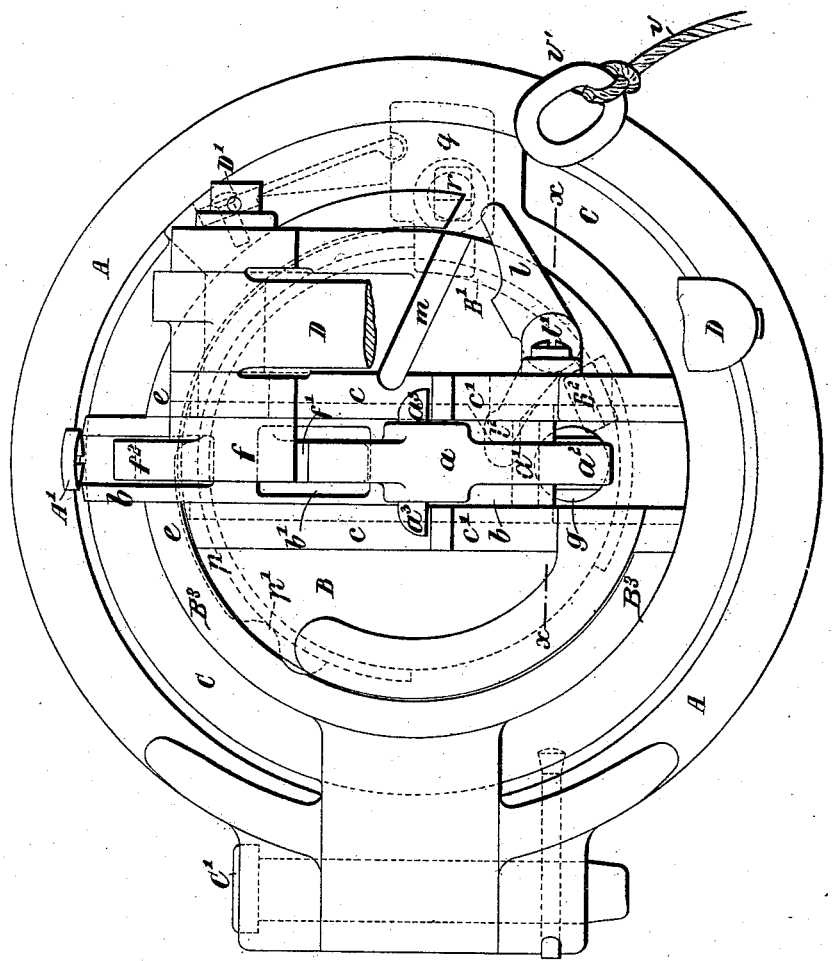
Figure 3:
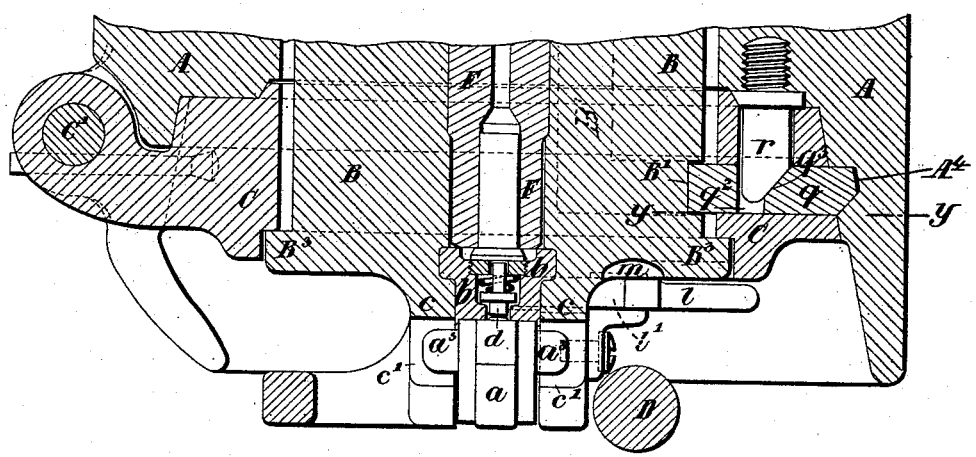
Figure 4:
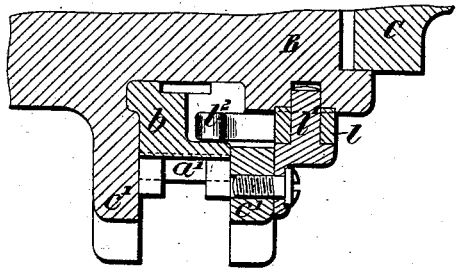
Figure 5:
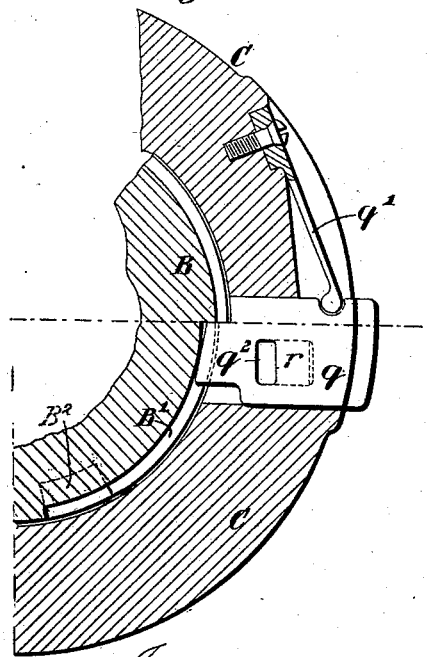
Figure 6:
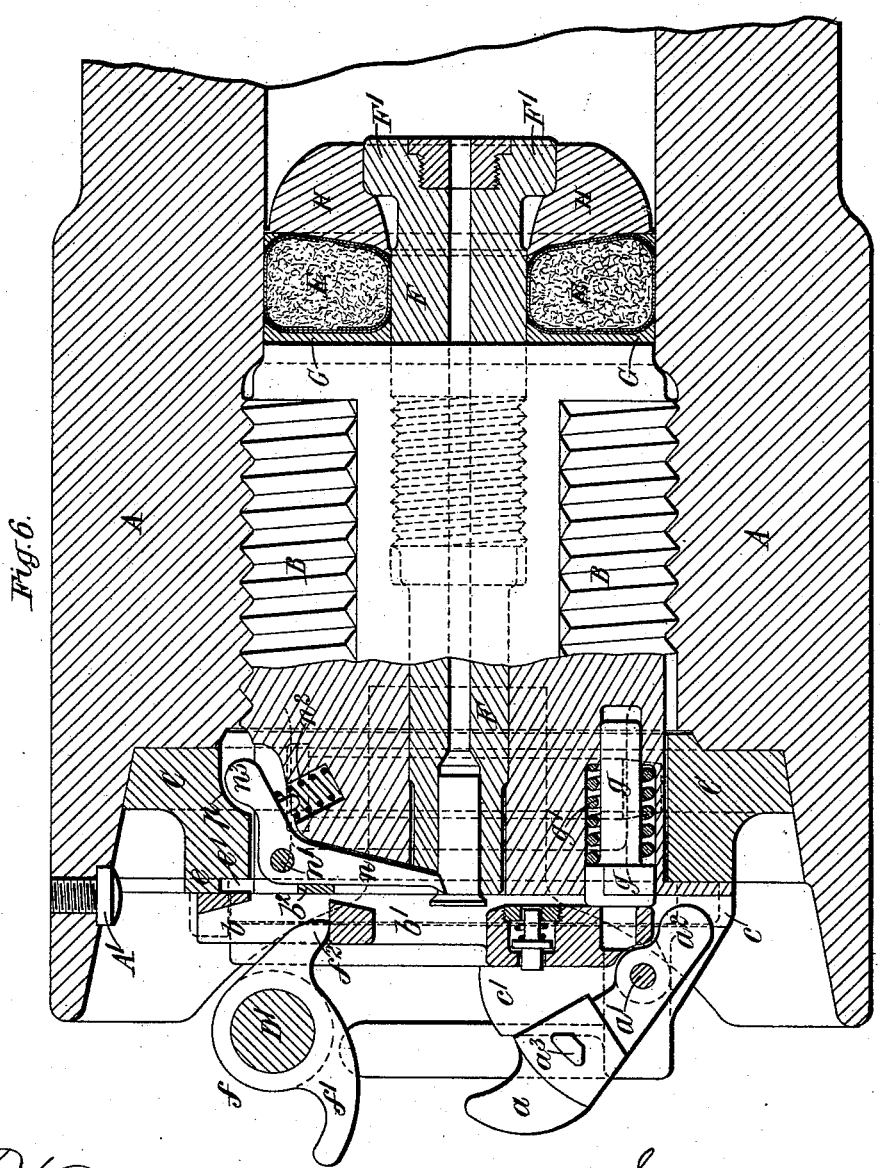
Figure 7:
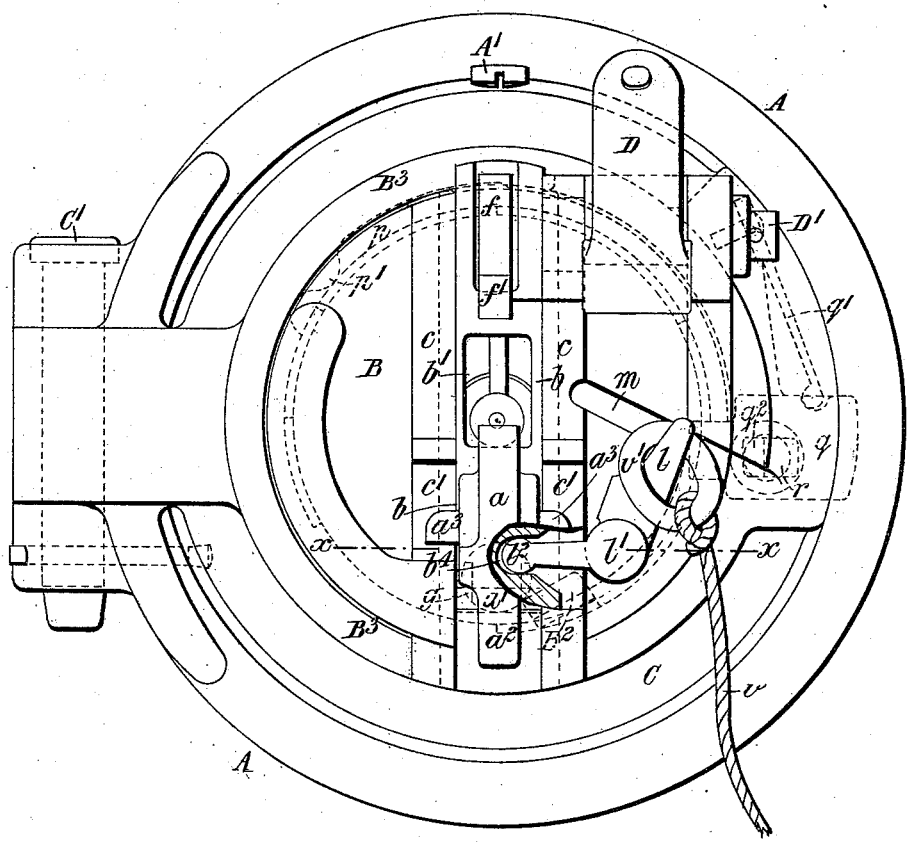
Figure 8:
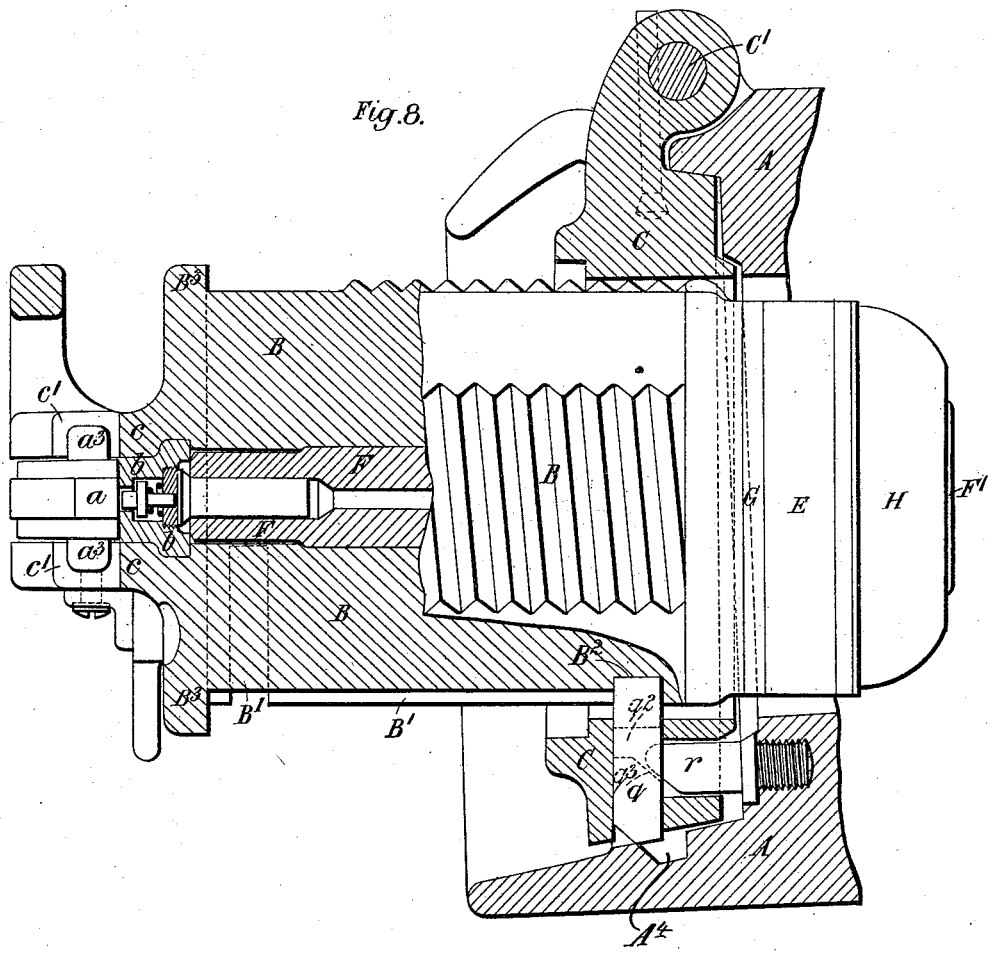
Figure 9:
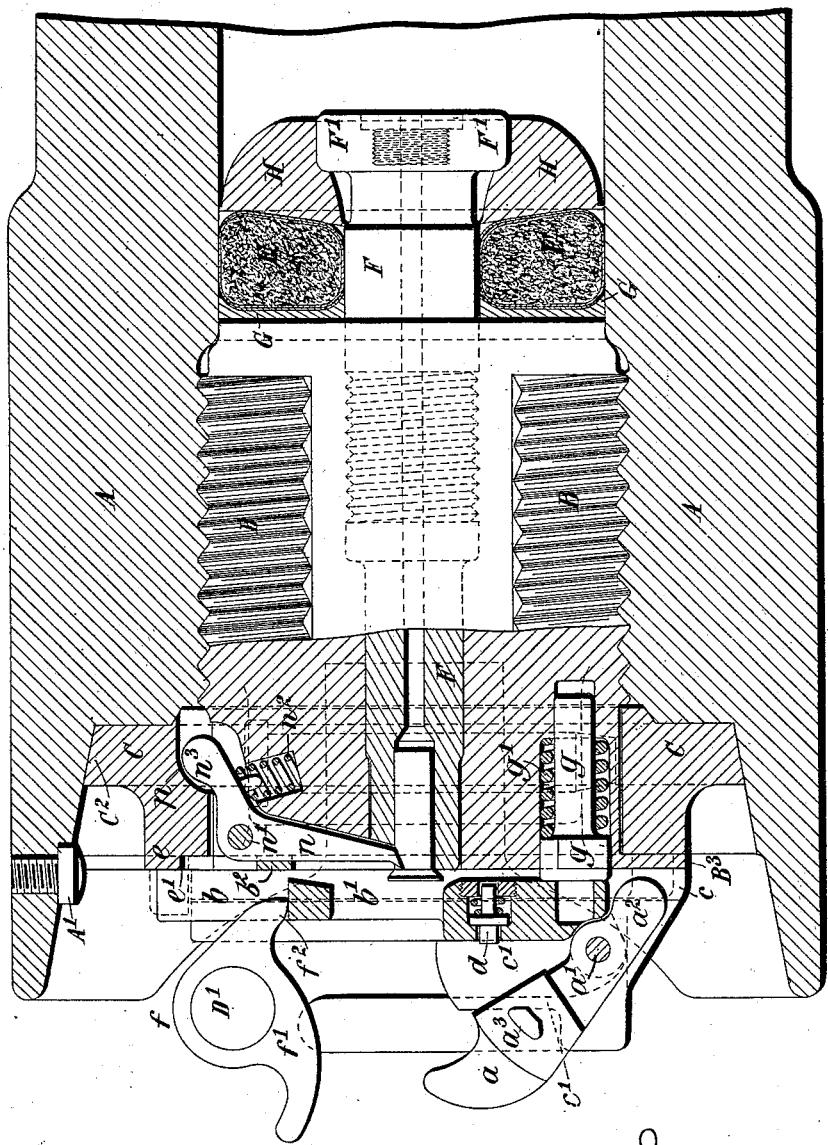
Figure 10:
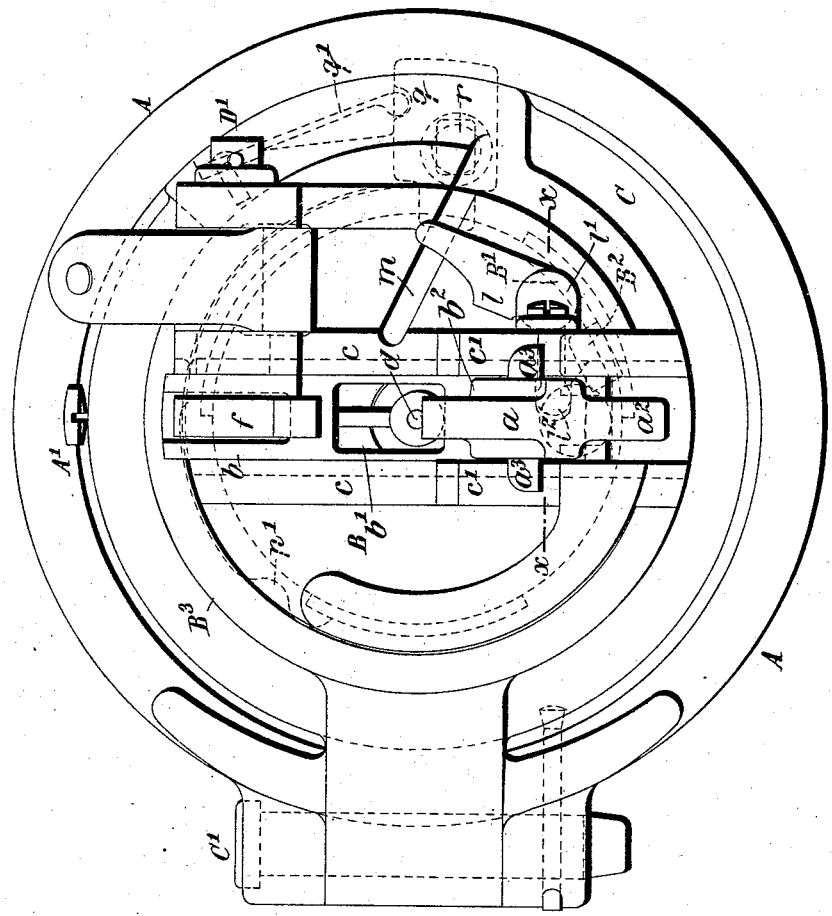
Figure 11:
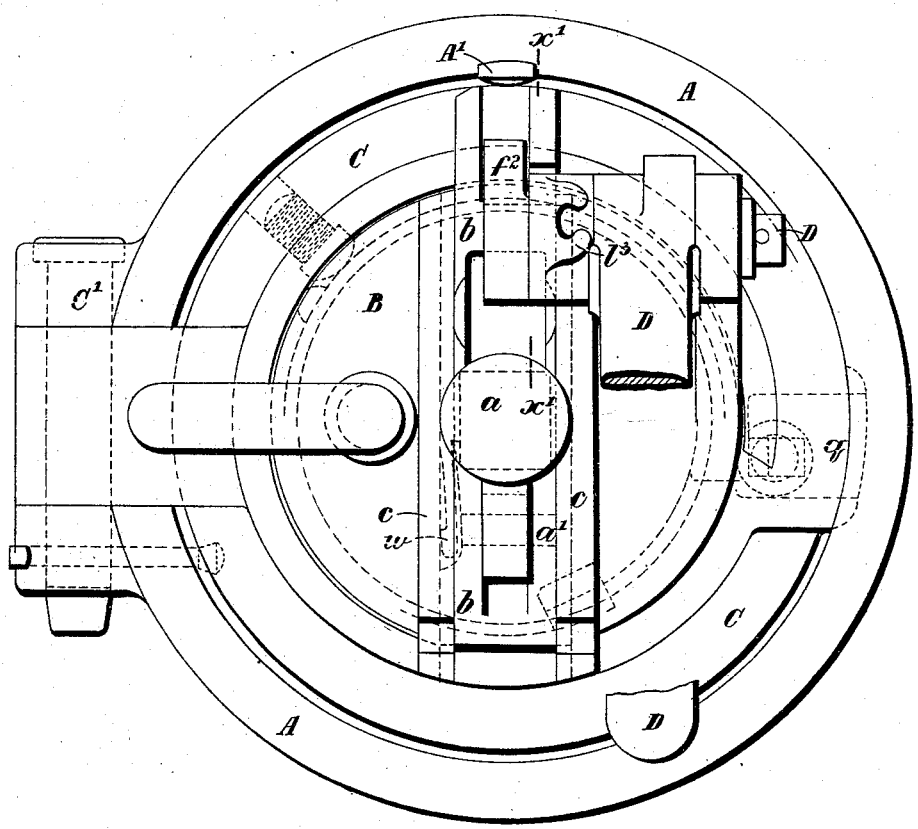

In the accompanying drawings, Figure 1 is a vertical longitudinal central section. Fig. 2 is a rear elevation, and Fig. 3 is a horizontal central section, showing part of the breech-loading gun having my present improvements applied thereto. Fig. 4 is a horizontal section on the line $x\ x$, Fig. 2. Fig. 5 is a transverse section on the line $y\ y$, Fig. 3. Figs. 6 and 7 are similar views to Figs. 1 and 2, respectively, the parts being shown in a different position. Fig. 8 is a horizontal section showing details of construction. Fig. 9 is a vertical longitudinal central section, and Fig. 10 is a rear elevation, showing the parts in the position which they occupy when the breech-screw is unlocked from its supporting bracket or carrier preparatory to opening the breech. Fig. 11 is a rear elevation, and Fig. 12 is a vertical longitudinal central section, of part of a gun, illustrating another form or modification of my improved firing mechanism. Fig. 13 is a vertical longitudinal section on the line $x'\ x'$ of Fig. 11; and Figs. 14 and 15 are transverse sections on the line $x^2\ x^2$ of Fig. 12, illustrating details of construction.

A is the body or barrel of the gun.

B is the breech-screw, which is provided with interrupted screw-threads adapted to engage with corresponding interrupted screw-threads in the breech of the gun.

C is the bracket or carrier for supporting the said breech-screw when withdrawn from the breech and which is hinged or pivoted at C' to the body of the gun.

D is a hand-lever, which is pivoted at D' to the breech-screw B to facilitate the opening and closing of the breech.

In guns as heretofore constructed wherein a plastic obturator, consisting of a ring or washer of asbestus, is employed the said obturator is fitted upon a movable head having a rod or stem free to turn in the central hole of the breech-screw, and is compressed between two parallel surfaces formed one upon the forward end of the breech-screw and the other upon the rear end of the said movable head.

In my improved gun the plastic obturator E is fitted upon a rod or stem F, firmly secured by screw-threads or otherwise in the central hole of the breech-screw B, and is situated between an annular steel cup or washer G at the forward end of the breech-screw and a movable head H, which is fitted to slide longitudinally upon the rod or stem F. This movable head is supported and guided by projections F' on the forward end of the said rod or stem and has a conical surface which bears against the plastic obturator. Around the projections or guides F' on the rod or stem F clearance-spaces are formed in the movable head H to facilitate the removal, by washing, of dirt or other substance which may be deposited between the rubbing-surfaces. The edges of the obturator where it bears against the wall of the chamber and against the rod or stem F are rounded, and the bearing-surfaces of the cup or washer G and of the movable head H are correspondingly curved. By the employment of this movable head and the fixed rod or stem and by the above-described peculiar form or configuration of the obturator and of the adjacent surfaces of the cup and movable head, between which the said obturator is compressed, I insure the obturation of the breech much more effectually than is practicable by the means heretofore used, and I obviate liability to excessive adherence of the obturator to the wall of the chamber.

The construction of the firing mechanism of my improved gun is clearly shown in Figs. 1, 2, and 3, the full lines in Fig. 1 showing the position of the parts immediately after the discharge, while the dotted lines show the hammer and other parts in the position which they occupy when the hammer has been cocked and the breech-screw is about to be unlocked to permit its rotation about its axis.

$a$ is the firing-hammer, which is carried by and pivoted at $a'$ to a bolt or bar $b$, fitted to slide in a transverse groove between projecting guides $c$ on the breech-screw B. The hammer $a$ is arranged to operate in combination with a firing-pin $d$, fitted in the sliding bolt or bar $b$ and acted upon by a suitable spring. The sliding bolt or bar $b$ is so arranged that when the gun is fired a projection on the said bolt or bar will enter a notch or recess $e'$ in the circular rim $e$ of the bracket C, and thus prevent rotation of the breech-screw about its axis. An adjustable stop A' is secured in the barrel or body of the gun for the purpose of limiting the upward movement of the said bolt or bar $b$, and thus regulating the action of the firing mechanism. A lever or cam $f$ is fixed on the shaft or pivot-pin D' of the hand-lever D, so that it will turn with the said hand-lever. The long arm $f'$ of the lever $f$ is arranged to act upon the firing-hammer $a$ for the purpose of cocking the same, as hereinafter described. The short arm $f^2$ of the said lever $f$ is arranged to act upon the sliding bolt or bar $b$, so that when lever D is raised or turned upward about its axis preparatory to opening the breech, the said arm $f^2$ will, after the cocking of the hammer is effected, depress the said bolt or bar $b$, and thus disengage it from the notch or recess $e'$ in the bracket C and unlock the breech-screw to allow the latter to be turned about its axis to disengage it from the screw-threads in the breech.

The hammer $a$ has a short arm $a^2$, against which bears a rod or plunger $g$, fitted to slide in a hole or cavity in the breech-screw B and acted upon by a spring $g'$, inclosed in the said hole or cavity and surrounding the said plunger. In the cocking of the hammer the plunger $g$ is pushed inward and the spring $g'$ is compressed. The bolt or bar can then slide downward behind the said plunger $g$, as shown in Fig. 9. The said hammer is, moreover, provided with studs or projections $a^3$, which, when the said hammer is cocked and the bolt or bar $b$ moved downward, bear against and slide upon the vertical rear surfaces of projections $c'$, formed on the guides $c$, thus retaining the hammer in its cocked position. The upper surfaces of the projections $c'$ are circular and concentric with the pivot-pin $a'$ of the hammer $a$, so that as soon as the bolt or bar $b$ is moved upward the studs $a^3$ can be moved over the curved upper surfaces of the projections $c'$ and the spring $g'$ will by its reaction actuate the hammer $a$ to fire the gun.

The sliding bolt or bar $b$ is formed with an aperture $b'$, through which, when the said bar has been depressed by the arm $f^2$ of the lever or cam $f$, a fuse or primer may be inserted in the vent-hole and through which the empty case of the said fuse or primer may be ejected, as hereinafter described.

To provide for the firing of the gun by means of a firing-cord or lanyard, a bent lever $l$ is pivoted at $l'$ to the breech-screw and is provided with a circular or spherical end $l^2$, which works in a slot $b^4$ in the sliding bolt or bar $b$. A hook or ring $v'$ on the firing-cord or lanyard $v$ is to be placed upon the other arm of the said lever $l$. When the bolt or bar $b$ is depressed, this arm of the said lever $l$ will extend across a groove $m$, formed in the rear end of the breech-screw, as shown in Fig. 7, and the said hook or ring $v'$ on the firing-cord or lanyard will be received and held in the said groove, as shown, so that the said hook or ring cannot slip off the lever $l$ until the latter has been actuated to fire the gun. When the firing-cord or lanyard is pulled to fire the gun, it will turn the lever $l$ about its pivot $l'$, thus raising the sliding bolt or bar $b$ until the projections $a^3$ on the hammer $a$ are brought into position to move over the curved upper surfaces of the projections $c'$. In this movement of the said lever $l$ the ring $v'$ is moved out of the groove $m$ and slips off the lever $l$, as shown in Fig. 2.

For extracting or ejecting the empty fuse-cases a bent lever or extractor $n$ is pivoted at $n'$ to the breech-screw and works in a recess or slot therein. The long arm of the said extractor is adapted to engage with the flange or head of the shell or case of a fuse or primer in the vent-hole. The short arm of the said extractor is acted upon by a spring $n^2$, which is inclosed in a cavity in the breech-screw and which tends to hold the said extractor in the position shown in Fig. 1. The said short arm is provided with a projection $n^3$, which extends into a segmental groove or recess $p$ in the bracket C. The said bracket is provided with a projection $p'$, Fig. 7, at one end of the groove $p$, which projection, when the breech-screw is turned about its axis to disengage it from the interrupted screw-threads in the breech, will act upon the projection $n^3$ of the extractor $n$, and by turning the latter about its pivot will effect the extraction or ejection of the empty fuse-case through the opening $b'$ in the sliding bolt or bar $b$.

When the hand-lever D is raised preparatory to opening the breech, the lever or cam $f$ turns with it about its axis, and the long arm $f'$ of the said lever $f$ cocks the hammer. In this movement the studs or projections $a^3$ of the hammer $a$ move along the circular upper surfaces of the projections $c'$ on the guides $c$, and the lower or short arm of the hammer, acting upon the plunger $g$, pushes the said plunger inward and compresses the spring $g'$. In the continued movement of the lever D in the same direction the upper or short arm $f^2$ of the lever or cam $f$ depresses the bolt or bar $b$, thereby disengaging it from the notch or recess $e'$ in the bracket C. In the downward movement of the bolt or bar $b$, as soon as the hammer $a$ has moved clear of the arm $f'$ the said hammer is retained in its cocked position by the studs or projections $a^3$ of the said hammer bearing against the rear surfaces of the projections $c'$ of the guides $c$. The bolt or bar $b$ moves down in rear of the plunger $g$ and keeps the spring $g'$ compressed. At the same time the aperture $b'$ in the bolt or bar $b$ is brought opposite the vent-hole, thus uncovering the said hole to permit the extraction of the empty fuse-case and the insertion of another fuse. In the downward movement of the bolt or bar $b$, moreover, the firing-lever $l$, on which the hook or ring of the firing-cord has previously been placed, is moved across the groove $m$, in which the said hook or ring is held until released by the act of firing the gun. The position of the said bolt or bar $b$ does not change when the lever D is lowered, the pressure of the spring $g'$ and plunger $g$ serving to prevent accidental movement or displacement of the said bolt or bar. The bolt or bar $b$ having been withdrawn, as above described, from the notch or recess $e'$ in the bracket C, the breech-screw is by means of the lever D turned about its axis—say, a sixth of a revolution—to disengage it from the interrupted screw-threads in the breech. In this partial rotation of the breech-screw the short arm $n^3$ of the extractor $n$ moves along the segmental groove or recess $p$ in the bracket C, and at the termination of this movement comes in contact with the projection $p'$, and by a sudden turning of the extractor about its pivot $n'$ ejects the empty fuse-case through the aperture $b'$.

In the closing of the breech the parts of the firing mechanism do not change their relative position. Another fuse or primer can, therefore, be introduced through the aperture $b'$. The breech must be completely closed before the bolt or bar $b$ can enter the notch $e'$ in the bracket C, and consequently before the said bolt or bar can be raised to bring the firing-pin opposite to or in line with the center of the fuse or primer. In all other positions of the breech-screw the head of the bolt or bar $b$ is held down by the circular rim $e$ of the bracket C. Complete immunity from premature discharge of the gun is thus insured.

To effect the discharge, the firing-cord connected with the free arm of the lever $l$ is pulled with considerable force, whereby said lever $l$ is turned about its pivot $l'$ and the bolt or bar $b$ is raised until it comes in contact with the stop A', which is previously so adjusted that the firing-pin will then be in its proper position relatively to the fuse or primer. The said bolt or bar is thus moved clear of the plunger $g$ and its projection $b^2$ is caused to engage with the notch $e'$ in the bracket C to lock the breech-screw and prevent turning of the same about its axis. In the upward movement of the sliding bar $b$ the studs $a^3$ of the hammer $a$ move along the vertical rear edges of the projections $c'$ of the guides $c$, and at the moment when the firing-pin comes in line with the fuse the said studs $a^3$ are in position to move along the circular upper surfaces of the said projections $c'$, the lower extremity of the hammer being acted upon by the spring-plunger $g$. The said hammer is then turned about its pivot and strikes the firing-pin, thus causing the discharge of the gun.

In the movement of the lever $l$ to fire the gun the free end of the said lever is moved away from the groove $m$ into the position shown in Fig. 2, and the hook or ring of the firing-cord is thus automatically released.

The firing mechanism above described has the following characteristics, viz.: The cocking of the firing-pin and the extraction of the fuse-case are performed automatically during the opening of the breech, the discharge cannot take place so long as the breech is not completely closed, and the firing-cord or lanyard is disconnected from the gun as soon as the discharge takes place.

For locking or fastening the bracket or carrier C to the breech when it is in its closed position or the breech-screw to its supporting bracket or carrier C when it is withdrawn from the breech I employ an automatic latch $q$, which is fitted to slide in a hole or cavity in the bracket C and one end of which extends into a groove B' in the breech-screw and bears against the bottom of the said groove, being acted upon by a spring $q'$, securely attached to the bracket C, as more clearly shown in Fig. 5. The other extremity of the said latch is beveled and serves as a bolt for locking the bracket C to the breech of the gun by entering a notch of corresponding form therein. The said latch is formed with a slot $q^2$, one of the surfaces $q^3$ of which is beveled or inclined, so that it is parallel to the bevel of the said latch. When the breech is closed, the inclined surface $q^3$ bears against a corresponding bevel on a stud $r$, fixed in the breech end of the gun. The said latch operates as follows—that is to say: When the breech is closed, the outer end of the latch is held in a notch $A^4$ in the body A of the gun by the bearing of its other end against the bottom of the groove B' in the breech-screw, as shown in Figs. 3 and 5, and the bracket C is thus firmly connected with the gun. It remains locked thereto while the breech-screw is being turned and withdrawn. When, however, the breech-screw is completely withdrawn, a depression or cavity $B^2$, Figs. 2, 3, 5, and 8, is brought opposite the latch, and at the commencement of the movement of the bracket C about its hinge or pivot C' the said latch moves inward under the action of its spring $q'$, sliding obliquely upon the level of the stud $r$, Figs. 3 and 4. The beveled bolt end of the latch is thus disengaged from the notch in the breech and the other end of the latch enters the depression or cavity $B^2$ in the breech-screw, thereby firmly locking together the breech-screw and the bracket C. In the closing of the breech the latch operates as follows, viz: As soon as the bracket C has come nearly into contact with the breech end of the gun the bevel of the stud $r$, acting upon the inclined surface $q^3$ of the latch, moves the latter outward, thereby withdrawing it from the depression or cavity $B^2$ and causing it to re-enter the notch in the breech. The breech-screw can then be pushed into the breech and turned therein to completely close the same.

The above-described construction and arrangement of the latch insure the automatic fastening of the bracket C to the breech of the gun, so that it is locked thereto until the breech-screw is completely withdrawn and the automatic connection of the breech-screw with the bracket as soon as the swinging of the latter about its hinge or pivot to open the breech is commenced.

The bracket C is made with a taper or conical part or flange $C^2$, which when the breech is closed fits into a corresponding conical recess provided for its reception in the rear end of the barrel, and a collar or flange $B^3$, Figs. 2, 3, and 8, is formed on the rear end of the breech-screw, which completely closes the apertures left between the segments of the interrupted screw-threads. Consequently no dust or foreign matter can get into the interior when the breech is closed and the mechanism is perfectly protected.

In the modification of my invention shown in Figs. 12 to 15 the hammer $a$ is pivoted at $a'$ to the sliding bolt or bar $b$ and has an arm $a^2$, which when the said bolt or bar is depressed moves in a groove provided in the head of the piston or plunger $g$ and compresses the spring $g'$. The projections $c'$ of the guides $c$, having the vertical rear and curved upper surfaces, and the studs or projections $a^3$ of the hammer (which serve to compress the spring in the arrangement shown in Figs. 1 to 10) are in this modification dispensed with. Moreover, in place of the firing-lever used in the arrangement shown in Figs. 1 to 10 I employ in this modification a ring $l$, mounted loosely upon the pivot-pin $D'$ of the hand-lever D. The firing-cord is attached to a hook $l^3$, formed on this ring. A projection or tooth $l^4$ is also formed on the ring $l$ and works in a notch or slot $b^2$ in the bolt or bar $b$, so that by pulling the firing-cord and turning the ring $l$ about the pivot-pin $D'$ the said bolt or bar may be raised to discharge the gun. The said ring $l$ may, if desired, be formed with more than one tooth and the bolt or bar $b$ be provided with corresponding teeth. The pivot-pin $D'$ of the hand-lever D has fixed thereon an arm $f^2$, which depresses the bolt or bar $b$ when the said hand-lever is turned into its operative position. The operation of this modified form of my improved firing mechanism is very simple—that is to say, when the hand-lever is raised preparatory to opening the breech the arm $f^2$ acts upon the bolt or bar $b$ and depresses the same, thus disengaging it from the notch $e'$ in the bracket C by the time the said hand-lever is completely raised. During this movement the hammer $a$ is cocked and its arm $a^2$ compresses the spring of the piston or plunger $g$, the parts then occupying the position shown by dotted lines. The bolt or bar $b$ is maintained at the bottom of its stroke or movement by a spring-catch $w$, which, when the breech-screw is turned about its axis to open the breech, engages with the edge of the breech-screw, as shown in Fig. 15, and thus holds down the bolt or bar $b$ while the breech is open. A projection $l^5$ upon the ring $l$ bears against the bolt or bar $b$ when the latter is down, and thus prevents the falling of the said bolt or bar while the breech is open. At the termination of the partial rotation of the breech-screw to close the breech the spring-catch $w$ strikes the part $C^3$ of the bracket C and is thereby disengaged, so that it no longer prevents the rising of the bolt or bar $b$. The hand-lever is then allowed to fall, the fuse is placed in position, and the gun discharged by pulling the firing-cord attached to the hook $l^3$. It is only necessary to pull the said cord strongly to lift up the bolt or bar $b$, which, carrying the hammer with it, causes the said hammer to fall suddenly upon the firing-pin, which strikes the fuse, the strength of the blow being further increased by the action of the spring $g'$ on the plunger or piston $g$, and through this plunger upon the arm $a^2$ of the hammer.

The other parts of the breech mechanism are substantially the same as in the arrangement hereinbefore described, and shown in Figs. 1 to 10.

It is obvious that I can somewhat further modify my apparatus without departing from the nature of my said invention.

What I claim is—

1. In a breech-loading gun, the combination, with the breech-screw, of a rod or stem firmly fixed therein and projecting from the forward end thereof, a cup or washer, and a plastic obturator placed upon the said rod or stem in front of the breech-screw, and a head fitted and retained upon the said rod or stem so that it is free to move longitudinally thereon, for the purposes above specified.

2. In a breech-loading gun, the combination, with the breech-screw, of a rod or stem firmly fixed therein and projecting from the forward end thereof, a plastic obturator on the said rod or stem in front of the breech-screw and having rounded edges, a cup or washer on the said rod or stem between the said obturator and the breech-screw and shaped to fit the rounded edges of the obturator, and a head secured upon the said rod or stem in front of the obturator and capable of to-and-fro movement upon the said rod or stem, the said head having its rear surface of conical form, substantially as and for the purposes above specified.

3. In a breech-loading gun, the combination, with the breech-screw, of a sliding bolt or bar arranged in a transverse groove in the rear end thereof, a firing-hammer pivoted to the said bolt or bar, an operating-lever pivoted to the breech-screw, and an arm or cam formed or fixed on the fulcrum-pin of the said lever and whereby the said sliding bolt or bar is actuated in the turning of the said lever about its pivot preparatory to opening the breech, for the purposes above specified.

4. In a breech-loading gun, the combination, with the breech-screw, the sliding bolt or bar arranged in a transverse groove in the rear end thereof, the firing-hammer mounted upon a pivot carried by the said sliding bolt or bar, and the operating-lever pivoted to the said breech-screw, of an arm or cam formed or fixed upon the fulcrum-pin of the said lever and projecting in front of the said hammer, so that in the turning of the said lever about its pivot preparatory to opening the breech the said arm or cam will cock the hammer, substantially as and for the purposes above specified.

5. In a breech-loading gun, the combination, with the breech-screw, of a sliding bolt or bar arranged in a transverse groove in the rear end thereof, a firing-hammer pivoted to the said bolt or bar, an operating-lever pivoted to the breech-screw, and a double-armed cam formed or fixed upon the fulcrum-pin of the said lever and whereby the said sliding bolt or bar is actuated and the hammer is cocked in the turning of the said lever about its pivot preparatory to opening the breech, substantially as and for the purposes above specified.

6. In a breech-loading gun, the combination, with the breech-screw, of a sliding bolt or bar arranged in a transverse groove in the rear end thereof and carrying the firing-hammer, an operating-lever pivoted to the said breech-screw, an arm or cam attached to the said lever for actuating the said sliding bolt or bar, and an adjustable stop secured in the body of the gun for limiting the movement of the said sliding bolt or bar, substantially as and for the purposes above specified.

7. In a breech-loading gun, the combination, with the breech-screw and a hinged or pivoted bracket or carrier for supporting the same, of a sliding bolt or bar arranged in a transverse groove in the rear end of the breech-screw and carrying the firing-hammer and provided with a projection adapted to enter a notch in the said bracket or carrier to prevent the turning of the breech-screw therein, substantially as and for the purposes above specified.

8. In a breech-loading gun, the combination, with the breech-screw, of the bolt or bar sliding in a transverse groove in the rear end thereof, a firing-hammer pivoted to the said sliding bolt or bar and provided with lateral projections or studs, and projections on the breech-screw which operate, in conjunction with the projections or studs on the firing-hammer, to retain the said hammer in its cocked position until the breech-screw is locked and then release the hammer and permit the operation thereof, substantially as and for the purposes above specified.

9. In a breech-loading gun, the combination, with the breech-screw and its supporting bracket or carrier, of the hand-lever D, pivoted to the breech-screw, the bolt or bar $b$, sliding in a transverse groove in the rear end of the said breech-screw and having a projection adapted to engage with a notch in the said bracket or carrier, a firing-hammer $a$, pivoted to the said sliding bolt or bar and acted upon by a plunger $g$ and spring $g'$, contained in a recess in the breech-screw, and the lever or cam $f$, fixed upon the fulcrum of the lever D and whereby when the said lever D is turned about its pivot preparatory to opening the breech the said sliding bolt or bar is disengaged from the notch in the bracket or carrier and the firing-hammer is cocked, substantially as and for the purposes above specified.

10. In a breech-loading gun, the combination, with the breech-screw, of a sliding bolt or bar arranged in a transverse groove in the rear end thereof and carrying the firing-hammer, a lever pivoted to the said breech-screw, one arm of which is in engagement with the said sliding bolt or bar and the other arm of which is adapted to receive a hook or ring on a firing-cord or lanyard, so that when the said firing-cord is pulled the said lever will be turned about its pivot and will actuate the sliding bolt or bar and thus fire the gun, substantially as and for the purposes above specified.

11. In a breech-loading gun, the combination, with the breech-screw and its supporting bracket or carrier, of the sliding bolt or bar $b$, arranged in a transverse groove in the said breech-screw and carrying the firing-hammer $a$, the firing-lever $l$, pivoted to the breech-screw and one end of which is in engagement with the said sliding bolt or bar, and a groove $m$, formed in the rear end of the breech-screw, which groove is adapted to receive a hook or ring on the firing-cord or lanyard, the said firing-lever being so arranged that when the gun is ready for firing it extends across the said groove, but in the firing of the gun it is moved clear of the said groove, substantially as and for the purposes above specified.

12. In a breech-loading gun, the combination, with the breech-screw and its supporting bracket or carrier, of a bent lever or extractor, which is pivoted to the breech-screw and one arm of which works in a circumferential groove in the said bracket or carrier, the other arm being adapted to engage with the flange of the shell or case of the fuse or primer, and a shoulder or projection at one end of the said groove, whereby the said extractor is operated at the termination of the partial rotation of the breech-screw about its axis to disengage it from the screw-threads in the breech, substantially as and for the purposes above specified.

13. In a breech-loading gun, the combination, with the breech-screw and its supporting bracket or carrier, of an automatically-operated bolt carried by said supporting bracket or carrier for locking said breech-screw to said carrier when the former is withdrawn from the breech, substantially as described.

14. In a breech loading gun, the combination, with the breech-screw and its supporting bracket or carrier, of a bolt carried by said supporting bracket or carrier, and means for operating said bolt to lock said breech-screw and carrier together on the withdrawal of the former from the breech and to lock said supporting bracket or carrier to the gun-body on the return of said breech-screw to the breech, substantially as described.

15. In a breech-loading gun, the combination, with the gun-body provided with a bolt-receiving notch, and a breech-screw provided with a corresponding bolt-receiving notch, of a breech-screw carrier, a bolt carried thereby automatically operating to lock the breech-screw and carrier together on the withdrawal of the former from the breech and to automatically lock the said carrier to the gun-body on the return of the breech-screw, substantially as described.

16. In a breech-loading gun, the combination, with the breech-screw and its supporting bracket or carrier, of locking mechanism comprising a bolt fitted to slide in the said bracket or carrier, a pin or stud fixed in the body of the gun and having an inclined surface whereby in the closing of the breech the said bolt is disengaged from the breech-screw and caused to engage with a notch in the body of the gun, and a spring attached to the said bracket or carrier and acting upon the said bolt, whereby in the opening of the breech the said bolt is disengaged from the notch in the body of the gun and caused to engage with the breech-screw, the said breech-screw being adapted while in the breech to retain the said bolt in the notch in the body of the gun, substantially as and for the purposes set forth.

17. In a breech-loading gun, the combination, with the breech-screw, of a supporting bracket or carrier therefor hinged or pivoted to the body of the gun and having a taper or conical flange or collar, a corresponding conical recess or seat in the breech of the gun into which the said flange or collar fits when the breech is closed, and a shoulder or flange $B^3$ on the breech-screw, which when the breech is closed bears against the rear surface of the said bracket or carrier, substantially as and for the purposes above specified.

In testimony whereof I have hereunto signed my name in the presence of two subscribing witnesses.

JEAN BAPTISTE GUSTAVE ADOLPHE CANET.

Witnesses:
J. L. RATHBONE,
R. J. PRESTON.